(12) United States Patent
Gut et al.

(10) Patent No.: US 10,247,377 B2
(45) Date of Patent: Apr. 2, 2019

(54) HEADLIGHT FOR A MOTOR VEHICLE

(71) Applicant: AUDI AG, Ingolstadt (DE)

(72) Inventors: Carsten Gut, Ingolstadt (DE); Florian Koch, Bad König (DE)

(73) Assignee: Audi AG, Ingolstadt (DE)

( * ) Notice: Subject to any disclaimer, the term of this patent is extended or adjusted under 35 U.S.C. 154(b) by 84 days.

(21) Appl. No.: 15/526,703

(22) PCT Filed: Oct. 29, 2015

(86) PCT No.: PCT/EP2015/002153
§ 371 (c)(1),
(2) Date: May 12, 2017

(87) PCT Pub. No.: WO2016/074765
PCT Pub. Date: May 19, 2016

(65) Prior Publication Data
US 2017/0321858 A1    Nov. 9, 2017

(30) Foreign Application Priority Data
Nov. 13, 2014 (DE) .................. 10 2014 016 835

(51) Int. Cl.
*B60Q 1/04* (2006.01)
*F21S 41/14* (2018.01)
*F21S 41/16* (2018.01)
*F21S 41/20* (2018.01)
*F21S 41/24* (2018.01)
(Continued)

(52) U.S. Cl.
CPC ............... *F21S 41/14* (2018.01); *B60Q 1/04* (2013.01); *F21S 41/141* (2018.01); *F21S 41/16* (2018.01); *F21S 41/24* (2018.01); *F21S 41/285* (2018.01); *F21S 41/65* (2018.01)

(58) Field of Classification Search
CPC .. F21S 41/14; F21S 41/24; F21S 41/16; F21S 41/141; F21S 41/285; F21S 41/65; B60Q 1/04
See application file for complete search history.

(56) References Cited

U.S. PATENT DOCUMENTS 7,780,326 B2    8/2010    Ito
9,188,726 B2    11/2015   Erdl et al.
(Continued)

FOREIGN PATENT DOCUMENTS

CN    103237683 A    8/2013
DE    101 33 869 A1    2/2002
(Continued)

*Primary Examiner* — Mary Ellen Bowman
(74) *Attorney, Agent, or Firm* — Seed IP Law Group LLP

(57) ABSTRACT

The invention relates to a headlamp (1) for a motor vehicle, with a first semiconductor light source (2) for generating a first radiation, with a second semiconductor light source (3) for generating a second radiation, and with an optical coupling device (4) to couple the generated radiations, which coupling device comprises a first and a second coupling surface (5, 6), wherein a converter element (8) for converting a primary radiation emitted by the first semiconductor light source (2) into the generated first radiation is arranged in an optical path between the first semiconductor light source (2) and the first coupling surface (5) in order to improve the light quality of the headlamp.

18 Claims, 2 Drawing Sheets

Figure 1:
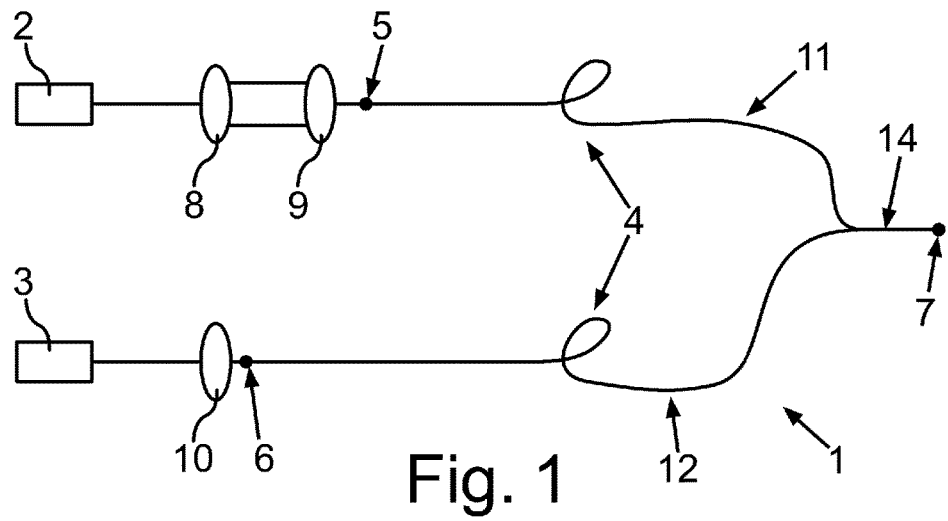

(51) Int. Cl.
*F21S 41/65* (2018.01)
*F21S 41/141* (2018.01)

(56) References Cited

U.S. PATENT DOCUMENTS

| | | | |
|---|---|---|---|
| 2004/0105275 A1* | 6/2004 | Sazuka | B60Q 1/04 362/507 |
| 2004/0149998 A1 | 8/2004 | Henson et al. | |
| 2005/0243570 A1* | 11/2005 | Chaves | G02B 19/0023 362/551 |
| 2012/0008098 A1 | 1/2012 | Akiyama | |
| 2012/0106184 A1* | 5/2012 | Kishimoto | B60Q 1/0011 362/510 |
| 2014/0016300 A1 | 1/2014 | Sato et al. | |
| 2014/0092619 A1* | 4/2014 | Bushre | B60Q 1/20 362/520 |
| 2014/0169015 A1 | 6/2014 | Chen | |
| 2014/0286032 A1 | 9/2014 | Fedosik et al. | |
| 2015/0016133 A1 | 1/2015 | Erdl et al. | |
| 2015/0023037 A1 | 1/2015 | Bauer et al. | |
| 2015/0316223 A1 | 11/2015 | Ziegler et al. | |
| 2016/0290583 A1* | 10/2016 | Suwa | F21S 41/143 |
| 2017/0122528 A1* | 5/2017 | Kadoriku | F21S 41/00 |

FOREIGN PATENT DOCUMENTS

| | | |
|---|---|---|
| DE | 10 2011 085 385 A1 | 5/2013 |
| DE | 10 2012 013 841 A1 | 5/2013 |
| DE | 10 2012 205 435 A1 | 10/2013 |
| DE | 10 2012 213 547 A1 | 2/2014 |
| DE | 10 2013 200 925 A1 | 7/2014 |
| EP | 2 384 934 A1 | 11/2011 |
| EP | 2 639 499 A2 | 9/2013 |
| GB | 2 365 112 A | 2/2002 |
| JP | 2010-232044 A | 10/2010 |
| WO | 2013/134805 A1 | 9/2013 |

* cited by examiner

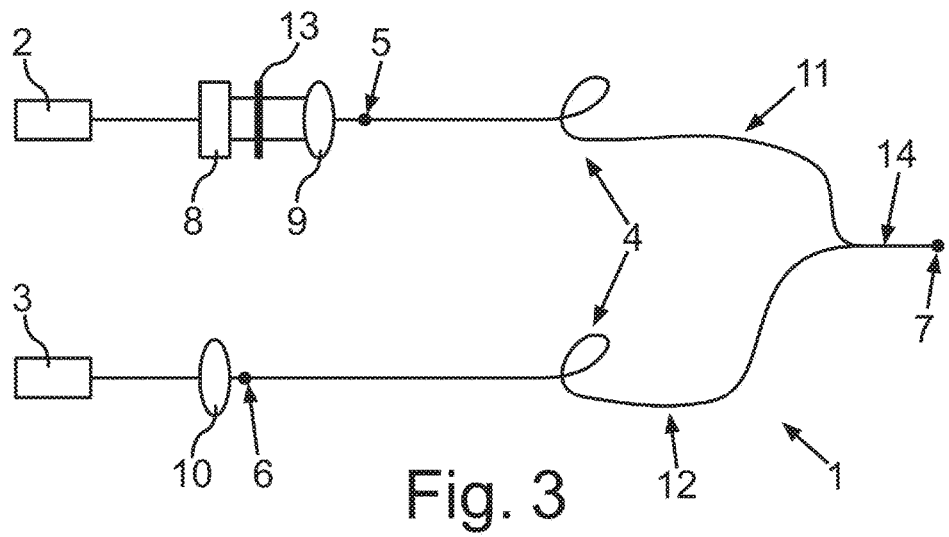
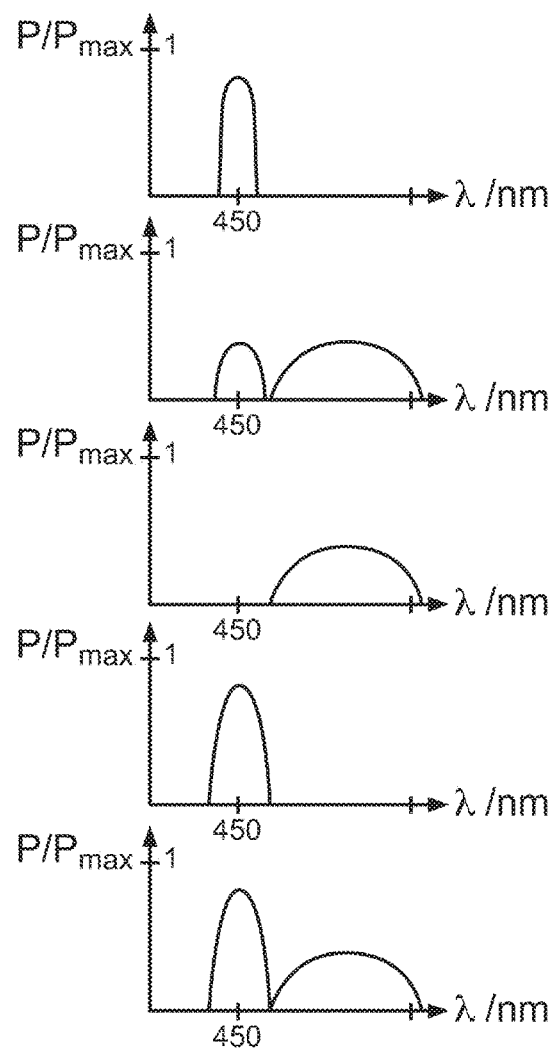
Fig. 3
Fig. 4

HEADLIGHT FOR A MOTOR VEHICLE

The invention relates to a headlamp for a motor vehicle, with a first semiconductor light source for generating a first radiation, and a second semiconductor light source for generating a second radiation, and an optical coupling device to couple the radiations generated.

In order to generate a luminous flux, which is required for headlamps, the optical energy of individual laser diodes (LD) overshoots significantly. Currently, there are headlamps that use three or four laser diodes in order to generate the required luminous flux. The individual beams of the respective laser diodes are in this case coupled in phase via a mirror system.

DE 10 2012 213 547 A1 discloses a lighting device for a motor vehicle, with a light guide for totally reflective guidance of light along a pair of opposite light guidance surfaces. In this case, the light originates from at least one light source and can be coupled into the light guide via a coupling surface. An exit surface is also provided, on which the light exits the light guide while removing the total reflection condition.

DE 10 2011 085 385 A1 also describes a lighting device for a motor vehicle, with a light guide for totally reflective guidance of light along a light propagation direction. In this case, the light originates from at least one light source and can be coupled on an end face of the light guide via at least one coupling surface. The minimum of one light source is a laser light source.

DE 101 33 869 A1 discloses a lamp device with a plate made of transparent material, onto which an arrangement of point-shaped electroluminescent point elements is mounted, with which also means for collimating a respectively occurring light beam are connected. These means may, for example, consist of an arrangement of reflective microprotrusions.

The task of the invention is to improve the light quality of a headlamp.

This task is solved by the subject matter of the independent claim. Advantageous embodiments result from the dependent claims, the description, and the figures.

An invention-related headlamp for a motor vehicle has a first semiconductor light source for generating a first radiation, and a second semiconductor light source for generating a second radiation, and an optical coupling device to couple the radiations generated. In the following, "radiation" is to be understood in particular as a light radiation, in particular with a spectrum in the visible range. The two semiconductor light sources are in particular technologically different semiconductor light sources. They can be based on different technical active principles and/or have different technical features. The optical coupling device comprises a first coupling surface to couple the first radiation generated by the first semiconductor light source as well as a second coupling surface to couple the second radiation generated by the second semiconductor light source. The radiations are coupled in the coupling device to form a total radiation. The coupling device furthermore comprises in particular a decoupling surface, where the total radiation exits. The headlamp may also comprise several first and/or several second semiconductor light sources.

In order to improve the quality of the headlamp, a converter element is arranged in an optical path between the first semiconductor light source and the first coupling surface in order to convert a primary radiation emitted by the first semiconductor light source into the first radiation generated. An optical path can be understood in this case as a propagation path of a light beam of the radiation. The converter element is in this case arranged in an optical path of the primary radiation. In particular, a converter element is in this case not arranged in an optical path between the second semiconductor light source and the second coupling surface of the optical coupling device so that the second radiation generated by the second semiconductor light source strikes the second coupling surface without a previous conversion of a wavelength. The converter element converts the primary radiation, which has a first wavelength distribution, into the generated first radiation with a different wavelength distribution. The semiconductor light sources may be adapted to one another so that by means of an in-phase pulsing of the semiconductor light sources, an extinguishing of the individual solitary waves of the respective radiations emitted by the respective semiconductor light sources is avoided in the coupling device. On the one hand, this has the advantage that the total radiation exiting at the decoupling surface of the optical coupling device has a single origin. A true so-called beam combining is achieved so that a high geometric precision is subsequently achieved, especially when dynamically deflecting the total radiation as is common in beam-guided headlamps. On the other hand, the spectra of the first and the second radiation are combined in the total radiation so that the spectral distribution of the total radiation can also be better adjusted via the different properties of the individual radiations and adapted to the desired overall properties.

An advantageous embodiment provides that the coupling device comprises an optical waveguide, in particular a multi-mode fiber. In this case, the optical waveguide has in particular a diameter between 100 µm and 2 mm. The optical waveguide may comprise several individual strands, which are then adapted in their length to one another in order to avoid a destructive interference of the coupled radiations. All wavelengths in the visible radiation range can be propagated through the optical waveguide. This has the advantage that the first and second radiation, which can include light or radiations of different wavelengths, are combined easily. Moreover, optical waveguides are in particular suited as a coupling device in a motor vehicle since they, in contrast to, for example, stepped mirrors, are robust and can be installed in a flexible and space-saving manner.

A preferred embodiment provides that the first semiconductor light source comprises a laser diode. This laser diode can emit a monochromatic primary radiation, which is converted by the converter element into the first radiation. This has the advantage that a high light density and a high light efficiency is provided.

A particularly advantageous embodiment provides that an optical filter element, which is adapted to the wavelength of the primary radiation of the first semiconductor light source, is arranged between the converter element and the first coupling surface. Especially if the primary radiation is a monochromatic primary radiation, it can be efficiently and completely filtered out by the optical filter element. A coupling of the primary radiation into the optical coupling device can be prevented thereby. This has the advantage that, especially if the primary radiation is a radiation or a light with a high intensity, such as is the case, for example, with a first semiconductor light source designed as a laser diode, this radiation cannot exit into an area surrounding the headlamp. This is particularly advantageous in case of damage to the converter element, such as a break, since the primary radiation would otherwise be fed with the full intensity into the coupling device in this case and the resulting total radiation would thus also constitute a danger in an area surrounding the headlamp. The consequences of an aging of the converter element can also be mitigated in the following way: In particular, if the light or radiation portion in the generated first radiation increases in the wavelength range of the primary radiation, this light or radiation portion is filtered out. Protection against both error sources is thus provided by the filter element. Persons in the environment are not endangered by the headlamp; it is eye-safe. An additional, usually required beam trap can be saved.

Another embodiment provides that the second radiation generated by the second semiconductor light source has at least substantially the same wavelength as the primary radiation of the first semiconductor light source. This has the advantage that a spectral gap in the total radiation, as can develop as a result of the optical filter element by filtering out the primary radiation from the first radiation, can be compensated. A high operational reliability can thus be combined with an improved optical quality of the headlamp.

A preferred embodiment provides that the radiation power and/or the radiation intensity of the second semiconductor light source in the wavelength range of the primary radiation of the first semiconductor light source is less than the radiation power and/or the radiation intensity of the first semiconductor light source in the wavelength range of the primary radiation. This has the advantage that a spectrum of the total radiation can thus be adjusted particularly well. In particular, in a combination with one of the embodiments mentioned in the last two paragraphs, it can thus be ensured that a radiation supplied to the total radiation in order to compensate for a spectral gap is not dangerous or to be more precise does not blind.

Another embodiment provides that the generated second radiation has a wavelength distribution that differs from the wavelength distribution of the first generated radiation and in particular covers a spectrum between 450 nm and 730 nm. This has the advantage that characteristics of the wavelength distribution of the first generated radiation are compensated or complemented so that the wavelength distribution of the total radiation is optimized and the headlamp thus has an improved light quality.

A preferred embodiment provides that the second semiconductor light source comprises a light-emitting diode. This has the advantage that the second radiation can be generated cost-effectively and energy-efficiently. By means of the plurality of different available light-emitting diodes, the spectral wavelength distribution can thus also easily modify or complement the total radiation to a predefined wavelength distribution. Especially if the first semiconductor light source comprises a laser diode, the advantages of the two semiconductor technologies can thus be combined. Disadvantageous characteristics, which each individual semiconductor technology itself may entail, can thus be compensated by the other respective semiconductor technology.

Another embodiment provides that a respective optical collimation element is arranged between the first coupling surface and the converter element and/or between the second coupling surface and the second semiconductor light source in order to collimate the respective generated radiations prior to coupling them in the coupling device. This has the advantage that an etendue of the respective generated radiations can be adjusted or reduced, which is favorable for a coupling into the coupling device and a later dynamic deflection of the total radiation.

The invention also relates to a motor vehicle with a headlamp according to one of the embodiments described.

Additional features of the invention result from the claims, the figures, and the figure description. All features and feature combinations mentioned above in the description as well as the features and feature combinations mentioned below in the figure description and/or shown only in the figures can be used not only in the specified combination but also in other combinations or even in isolation without going beyond the scope of the invention. Thus, also embodiments that are not explicitly shown and explained in the figures, but result and can be produced from the explained embodiments by means of separated feature combinations are to be considered as included in and disclosed by the invention.

Figure 2:
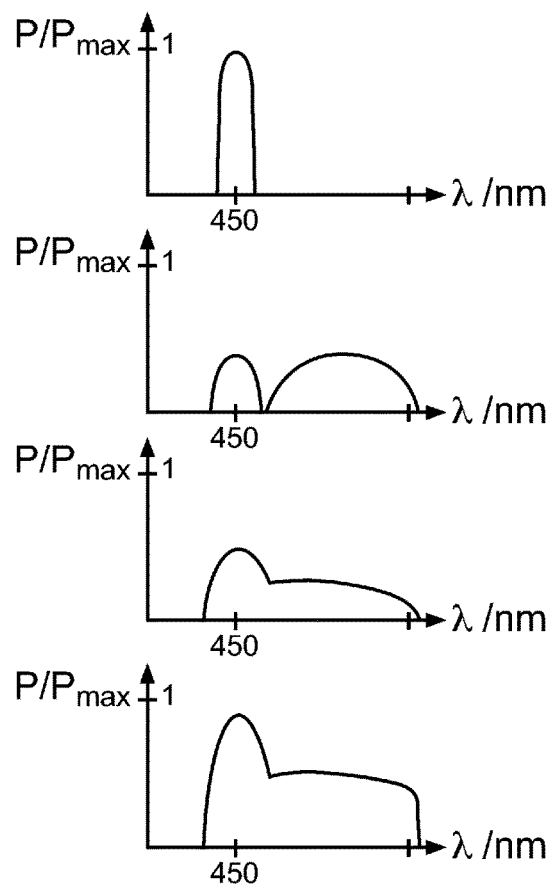

Exemplary embodiments of the invention are explained in greater detail below with reference to the schematic illustrations. They show:

FIG. 1 a schematic representation of an exemplary embodiment of a headlamp;

FIG. 2 wavelength distributions occurring in the embodiment according to FIG. 1;

FIG. 3 a schematic representation of another exemplary embodiment of a headlamp; and FIG. 4 wavelength distributions occurring in the embodiment according to FIG. 3;

In the figures, the same elements or elements with the same function are provided with the same reference numbers.

FIG. 1 shows a schematic representation of an exemplary embodiment of a headlamp. The headlamp 1 comprises in this case a first semiconductor light source 2 and a second semiconductor light source 3. The first semiconductor light source 2 is in this case designed as a laser diode, for example with a power of 1.6 W, and emits a monochromatic primary radiation, in this case with a wavelength of 450 nm. The second semiconductor light source 3 is designed as a light-emitting diode in the example shown and emits radiation in this case in a spectral range between 450 nm and 730 nm in accordance with a predefined wavelength distribution, which is shown in FIG. 2. The intensity of the second semiconductor light source 3 is in this case 100 lumens, for example. The headlamp 1 also comprises an optical coupling device 4, which comprises in this example a first individual strand 11 with a first coupling surface 5 and a second individual strand 12 with a second coupling surface 6. The two individual strands 11, 12 are in this case combined to form a total strand 14. On the total strand 14, the optical coupling device 4 also comprises a decoupling surface 7, where a total radiation is generated by a coupling of the radiations coupled in the first and second coupling surface 5, 6 into the coupling device 4. A converter element 8 as well as a collimation element 9 is in this case arranged in an optical path between the first semiconductor light source 2 and the first coupling surface 5. In this case, the collimation element 9 is arranged behind the converter element 8 when viewed from the semiconductor light source 2. Another collimation element 10 is arranged between the second semiconductor light source 3 and the second coupling surface 6. The converter element 8 is in the present case designed as a fluorescent converter. The two collimation elements 9, 10 are designed as collecting lenses.

A monochromatic primary radiation emitted by the first semiconductor light source 2 thus strikes the converter element 8. The latter converts the monochromatic primary radiation, which in this case has a wavelength of, for example, 450 nm, into a white first radiation, which has a broad spectrum, a broad wavelength distribution in the visible range. In contrast to the primary radiation of the first semiconductor light source 2, this first radiation has a high etendue since the converter element 8 emits the first radiation according to Lambert's law via a large surface compared to an emitting surface of the first semiconductor light source 3. Via the collimation element 9, which is arranged as close as possible to the converter element 8 in this case, the emitted first radiation of the converter element 8 is collimated. In doing so, the original etendue is not restored. The collimated first radiation is subsequently fed via the first coupling surface 5 into the optical coupling device 4, which in this case is designed as an optical waveguide. The optical waveguide is in this case designed as a multi-mode fiber so that all wavelengths are propagated in it.

For the second semiconductor light source 3, different light-emitting diodes are available, which respectively generate a second radiation with different characteristic wavelength distributions. In this case, a fluorescent converter can be accommodated directly in a housing of the light-emitting diode. The emitted second radiation of the second semiconductor light source 3 is collimated via the additional collimation element 10, in this case the collecting lens, and fed via the second coupling surface 6 directly into the optical coupling device 4. In the example shown, a coupling of the first and second radiations respectively fed into the coupling device 4 takes place via a combining of the respective individual strands 11, 12, of the optical waveguide at a coupling point to form a total strand 14. In the example shown, the radiation of a light-emitting diode and of a laser diode are thus coupled to form a total radiation, which can be used in the headlamp 1 with the decoupling point 7 of the coupling device 4 as unitary origin. In this case, the semiconductor light sources are adjusted to an in-phase pulsing, and the two individual strands 11, 12 of the coupling device 4 have an identical length so that the individual waves are not extinguished.

FIG. 2 shows four spectral wavelength distributions, which occur in the exemplary embodiment of a headlamp according to FIG. 1. A standardized radiation power $P/P_{max}$ versus a wavelength $\lambda$ is respectively plotted.

The top graph shows a wavelength distribution of the primary radiation emitted by the first semiconductor light source 2. This is a monochromatic spectrum with a close Gaussian distribution about a predefined wavelength, in this case 450 nm, since the first semiconductor light source 2 in this case is a laser diode. The peak in this example has a width of 5 nm and reaches the maximum radiation power $P_{max}$.

The second graph from the top shows a wavelength distribution of the first radiation generated by the first semiconductor light source 2. In the example shown, this radiation still has a narrow maximum at a wavelength of 450 nm, which corresponds to the maximum in the top graph. It is however far less pronounced and reaches about half of the maximum radiation power $P_{max}$. Another, substantially broader maximum is however found in the higher wavelength range. This portion of the wavelength distribution was generated in the converter element 8 by the irradiation with the primary radiation and the conversion of the same. In the example shown, a spectral gap exists between the two maximums, i.e. the two maximums are separated from one another in the example shown.

The third graph from the top shows a wavelength distribution of the second radiation generated by the second semiconductor light source 3. This also has a maximum in the range of 450 nm, which maximum is however significantly broader than the maximum of the primary radiation. Starting from this maximum at 450 nm, the wavelength distribution for higher wavelength ranges continuously decreases. The largest emitted wavelength of the second semiconductor light source 3 is at about 730 nm in the example shown.

The fourth graph from the top finally shows a wavelength distribution of the resulting total radiation, which is generated by coupling the first and the second radiation. This wavelength distribution increases sharply to a maximum at 450 nm in order to subsequently decrease just as sharply, similarly to the wavelength distribution of the second radiation, and to then remain approximately constant for larger wavelengths in the standardized radiation power $P/P_{max}$, and to abruptly drop off above 730 nm. In this case, a particularly even spectral wavelength distribution of the total radiation at the decoupling surface 7 is thus realized in this case by combining the first and the second radiation.

FIG. 3 schematically shows another exemplary embodiment of a headlamp 1. The structure in this case largely corresponds to the exemplary embodiment shown in FIG. 1, but an optical filter element 13 is arranged between the converter element 8 and the collimation element 9. The optical filter element 13 can also be arranged directly on the converter element 8. The optical filter element 13 is adapted to a wavelength of the primary radiation in order to filter it out or to absorb or reflect it. In the example shown, the optical filter element 13 is accordingly very limited in bandwidth and exclusively filters out radiation of the wavelength of the primary radiation, i.e. in this case radiation with a wavelength of 450 nm. The present embodiment furthermore differs from the embodiment shown in FIG. 1 in that the second semiconductor light source 3, which is also designed as a light-emitting diode, no longer emits white light or white radiation, but that the second radiation has the same wavelength as the primary radiation emitted by the first semiconductor light source 2. In this case, the second semiconductor light source 3 thus emits a second radiation with a wavelength of 450 nm, in particular exclusively with this wavelength.

As in the exemplary embodiment described above, the monochromatic primary radiation emitted by the first semiconductor light source 2, in this case with a wavelength of 450 nm, is radiated onto the converter element 8, which converts the monochromatic primary radiation into a white first radiation with a broad wavelength distribution. From the first radiation, the wavelength of the primary radiation, in this case 450 nm, is now filtered out by the optical filter element 13. When viewed from the first semiconductor light source 2, the first radiation now has a limited spectrum behind the optical filter element 13. This limited spectrum is shown in the third graph from the top in FIG. 4. The spectral wavelength distribution of the first radiation after the filter element 13 now no longer covers a spectral range of 450 nm to 730 nm as in the first exemplary embodiment of FIG. 1 but only one of approximately 460 nm to 730 nm. As described above for the first radiation for FIG. 1, this first radiation with the limited wavelength distribution is now collimated by a collimation element 9 designed as a collecting lens. In doing so, the original etendue is also not restored. As above, the collimated first radiation is then fed via the first coupling surface 5 into the optical coupling device 4. After a collimation by the additional collimation element 6, the second radiation of the second semiconductor light source 3 is also fed via the second coupling surface 6 into the optical coupling device 4, which in this case is again designed as an optical waveguide. As above, the first radiation of the laser diode and the second radiation of the light-emitting diode is thus coupled in the coupling device 4 to form a total radiation. By coupling the first radiation with the second radiation, in this case blue, of the second semiconductor light source 3, the portion, in this case blue, of the first radiation filtered out by the filter element 13 and thus missing in the first radiation after the converter element 18 is compensated in the total radiation. The wavelength distribution of the total radiation consequently does not have any gap in the wavelength range of the primary radiation.

FIG. 4 schematically shows five spectral wavelength distributions, which occur in the exemplary embodiment of a headlamp according to FIG. 3. As in FIG. 2, a standardized radiation power $P/P_{max}$ versus a wavelength $\lambda$ is respectively plotted.

The first graph from the top in this case shows the wavelength distribution of the primary radiation emitted by the first semiconductor light source 2. Since the semiconductor light source 2 in FIG. 3 is also a laser diode with a wavelength of 450 nm, the graph is identical to the top graph of FIG. 2.

The second graph from the top shows the wavelength distribution of the first radiation directly after the converter element 8 but before the optical filter element 13. The wavelength distribution is identical to the one in the second graph from the top of FIG. 2, with a first maximum at 450 nm and a second, substantially broader maximum in a higher wavelength range.

The third graph from the top shows the wavelength distribution of the first radiation after passing through the filter element 13. Compared to the wavelength shown in the second graph from the top, the first maximum at 450 nm is now completely filtered out, but the second, broader, and less pronounced maximum in the higher wavelength range remains unchanged.

The fourth graph finally shows the wavelength distribution of the second radiation generated by the second semiconductor light source 3. In this case, this radiation is also a monochromatic radiation, with a wavelength of 450 nm here. However, compared to the wavelength distribution shown in the first graph, it has a significantly broader maximum since a light-emitting diode generates a more broadband radiation than a laser diode.

The fifth graph from the top finally shows the wavelength distribution of the total radiation at a decoupling surface 7 and corresponds in this respect to the fourth graph from the top in FIG. 2. The shown wavelength distribution however differs significantly. It is composed of the broad maximum at about 450 nm shown in the fourth graph from the top as well as the broad maximum in the higher wavelength range shown in the third graph. The wavelength range covered by the total radiation thus extends from about 450 nm to 730 nm and has two maximums. The maximum at 450 nm is in this case pronounced more strongly and also more narrowly than the maximum in the higher wavelength range. It is however significantly broader than the maximum of the first semiconductor light source 2 at 450 nm and in addition has a lower standardized radiation power $P/P_{max}$ so that the headlamp 1 (FIG. 3) is eye-safe.

The invention claimed is:

1. A headlamp for a motor vehicle, comprising
a first semiconductor light source for emitting a primary radiation having a first wavelength;
a second semiconductor light source for generating a second radiation having a second wavelength that is substantially the same as the first wavelength;
an optical coupling device for coupling a first radiation and the second radiation, the optical coupling device includes a first and a second coupling surface;
a converter element arranged in an optical path between the first semiconductor light source and the first coupling surface, the converter element configured to convert the primary radiation into a first radiation; and
an optical filter element arranged between the converter element and the first coupling surface, the optical filter element being adjusted to the first wavelength.

2. The headlamp according to claim 1, wherein the optical coupling device includes an optical waveguide.

3. The headlamp according to claim 1, wherein
the first semiconductor light source comprises includes a laser diode.

4. The headlamp according to claim 1, wherein
a radiation power or a radiation intensity of the second semiconductor light source in a wavelength range of the primary radiation is less than a radiation power or a radiation intensity of the first semiconductor light source in the wavelength range of the primary radiation.

5. The headlamp according to claim 1, wherein
the second radiation has a wavelength distribution that differs from a wavelength distribution of the first radiation.

6. The headlamp according to claim 1, wherein
the second semiconductor light source includes a light-emitting diode.

7. The headlamp according to claim 1, further including
a first optical collimation element arranged between the first coupling surface and the converter element, the first optical collimation element configured to collimate the first radiation.

8. A motor vehicle, comprising:
a headlamp including:
a first semiconductor light source that, in operation, emits a primary radiation;
a second semiconductor light source that, in operation, generates a second radiation having substantially a same wavelength as the primary radiation;
an optical coupling device that, in operation, couples a first radiation and the second radiation, the optical coupling device includes a first and a second coupling surface;
a converter element arranged in an optical path between the first semiconductor light source and the first coupling surface, the converter element configured to convert the primary radiation into a first radiation; and
an optical filter element arranged between the converter element and the first coupling surface, the optical filter element being adjusted to a wavelength of the primary radiation.

9. The motor vehicle according to claim 8, wherein the optical coupling device includes an optical waveguide.

10. The motor vehicle according to claim 8, wherein a radiation power or a radiation intensity of the second semiconductor light source in a wavelength range of the primary radiation is less than a radiation power or a radiation intensity of the first semiconductor light source in the wavelength range of the primary radiation.

11. The motor vehicle according to claim 8, wherein the second radiation has a wavelength distribution that differs from a wavelength distribution of the first radiation.

12. The headlamp according to claim 1, wherein the optical filter element is configured to completely filter out the primary radiation.

13. The headlamp according to claim 2, wherein the optical waveguide is a multi-mode fiber.

14. The headlamp according to claim 5, wherein the wavelength distribution of the second radiation covers a spectrum between 450 nm and 730 nm.

15. The headlamp according to claim 1, further including a second optical collimation element arranged between the second coupling surface and the second semiconductor light source, the second optical collimation element configured to collimate the second radiation.

16. A device, comprising:
- a first semiconductor light source that, in operation, emits a primary radiation having a first wavelength;
- a second semiconductor light source that, in operation, generates a second radiation having a second wavelength that is substantially the same as the first wavelength;
- an optical coupling device that, in operation, couples a first radiation and the second radiation, the optical coupling device having a first coupling surface and a second coupling surface;
- a converter element arranged in an optical path between the first semiconductor light source and the first coupling surface, the converter element, in operation, converting the primary radiation into a first radiation; and
- an optical filter element arranged in an optical path between the converter element and the first coupling surface, the optical filter element being adjusted to a wavelength of the primary radiation.

17. The device according to claim 16, further including a first optical collimation element arranged in an optical path between the first coupling surface and the converter element, the first optical collimation element configured to collimate the first radiation.

18. The device according to claim 16, further including a second optical collimation element arranged in an optical path between the second coupling surface and the second semiconductor light source, the second optical collimation element configured to collimate the second radiation.

* * * * *